United States Patent [19]

Noi et al.

[11] Patent Number: 4,839,097
[45] Date of Patent: Jun. 13, 1989

[54] VOLTAGE-DEPENDENT NON-LINEAR RESISTANCE CERAMIC COMPOSITION

[75] Inventors: Keiichi Noi, Kyoto; Akihiro Takami, Katano; Kazuhide Ebine, Katano; Kimiko Kumazawa, Ikoma, all of Japan

[73] Assignee: Matsushita Electric Industrial Co., Ltd., Kadoma, Japan

[21] Appl. No.: 13,176

[22] Filed: Feb. 9, 1987

Related U.S. Application Data

[63] Continuation of Ser. No. 708,079, Feb. 26, 1985, abandoned.

[30] Foreign Application Priority Data

Jun. 28, 1983 [JP] Japan .................. 58-117569
Jun. 28, 1983 [JP] Japan .................. 58-117580
Jun. 28, 1983 [JP] Japan .................. 58-117581

[51] Int. Cl.$^4$ .................. H01B 1/06; C04B 35/46
[52] U.S. Cl. .................. 252/520; 252/521; 501/136
[58] Field of Search .................. 501/136; 252/520, 521

[56] References Cited

U.S. PATENT DOCUMENTS

| | | | |
|---|---|---|---|
| 4,519,942 | 5/1985 | Yamaoka et al. | 252/520 |
| 4,541,974 | 9/1985 | Yamaoka et al. | 264/61 |
| 4,545,929 | 10/1985 | Masuyama et al. | 252/520 |
| 4,547,314 | 10/1985 | Masuyama et al. | 252/520 |

FOREIGN PATENT DOCUMENTS

| | | | |
|---|---|---|---|
| 0044981 | 2/1982 | European Pat. Off. | 501/136 |
| 0070504 | 1/1983 | European Pat. Off. | |
| 0070540 | 1/1983 | European Pat. Off. | 501/136 |
| 0101824 | 3/1984 | European Pat. Off. | 501/136 |
| 101824 | 3/1984 | European Pat. Off. | |
| 57-20723 | 12/1982 | Japan . | |

Primary Examiner—William R. Dixon
Assistant Examiner—Ann M. Bosco
Attorney, Agent, or Firm—Cushman, Darby & Cushman

[57] ABSTRACT

This is a voltage-dependent non-linear resistance ceramic composition wherein resistance of crystal is decreased by containing $SrTiO_3$ as host material, and $Nb_2O_5$ and $Ta_2O_5$ as semiconductorization accelerating agent, and further by adding as additive one kind or more oxide of element selected from the group consisting of $MnO_2$, Ga, Pt, Tl, Si, Ti, Li, La, Cu, Y, Cs, Au, Mo, S, Be, Al, Na, K, Ca, Cd, In, Ba, Pb, Eu, Gd, Tb, Tm, Lu, Th, Ir, Os, Hf, Ru, Mg, Zr, Sn, Sb and W, these additive is segregated at crystal granule boundaries, thereby making the crystal granule boundaries to high resistance.

Accordingly, by the high resistance layer at the crystal boundaries the varistor characteristic is obtainable, and a capacitance characteristic is obtainable between the crystal granule-crystal granule boundary-crystal granule.

From this, an element having both functions of the varistor characteristics and the capacitor characteristics are obtainable, and performs effect in surge absorption and noise elemination.

1 Claim, 2 Drawing Sheets

VOLTAGE-DEPENDENT NON-LINEAR RESISTANCE CERAMIC COMPOSITION

This is a continuation of application Ser. No. 708,079, filed Feb. 26, 1985 which was abandoned upon the filing hereof.

TECHNICAL FIELD

The present invention relates to a voltage dependent non-linear resistance ceramic composition for use in surge absorbing and noise elimination in various electric apparatuses and electronic apparatuses.

BACKGROUND ART

Heretofore, in various electric apparatuses and electronic apparatuses, in order to absorb extraordinary high voltage, elimination of noise, elimination of arc, and the like, SiC varistors or varistors of ZnO system having a voltage-dependent non-linear resistance characteristics are used. Voltage-current characteristic of such varistors can be approximately represented by the following equation:

$$I=(V/C)^\alpha,$$

wherein I is current, V is voltage, C is a constant proper for the varistor, and $\alpha$ is a voltage non-linearity exponent.

The $\alpha$ of the SiC varistor is about 2–7, and for the ZnO system varistor there is ones that reaching 50. Though such varistors has superior characteristic for absorbing relatively high voltage called surge, for voltages lower than varistor voltage (for instance, absorption of noise) almost no effect is represented since its dielectric constant is low and its inherent capacitance is small, and their dielectric loss tan $\delta$ are so large as 5–10%.

On the other hand, for elimination of low voltage noise, static electricity, or the like, by appropriately selecting composition and firing condition, semiconductor ceramic capacitors having apparent dielectric constant of about $5\times10^4 - 6\times10^4$ and tan $\delta$ of about 1% are utilized.

However, these semiconductor ceramic capacitor is liable to be destroyed or become to be non-functional as capacitors when extraordinary high voltage such as surge is impressed thereon or a current above a certain limit is impressed on the element. For such reason, in the electric apparatuses or electronic apparatuses, for the purpose of both the absorbing of high voltage surge and the elimination of low volage noise, the varistors are used being combined with capacitors and other component (for instance, coil), and for instance, a noise filter has such configuration.

FIG. 1 shows general noise filter circuit, FIG. 2 shows a conventional noise filter circuit constituted by combining a varistor, capacitors and a coil, and 1 is the coil, 2 and the capacitors and 3 is the varistor.

When a noise input A shown in FIG. 5 is impressed on these circuits, output characteristics from general noise filter circuit of FIG. 1 is such as C of FIG. 5, and noise is not eliminated sufficiently. Output characteristic from the conventional noise filter circuit including a varistor shown in FIG. 2 is such as B of FIG. 5, and though noise is eliminated, such configuration has a shortcoming that it has large number of components in the inside of the apparatus and besides is contrary to tendency of miniaturization of the apparatus.

Accordingly, an electronic component, which absorbs extraordinary high voltage, can eliminate low voltage, such as noise and has small number of components, and capable of miniaturization, is demanded.

DISCLOSURE OF THE INVENTION

Accordingly, the present invention intends to provide a voltage-dependent non-linear resistance ceramic composition comprising 90.800–99.996 mol % of $SrTiO_3$ and as metal oxides for semiconductorization acceleration 0.001–0.200 mol % of $Nb_2O_5$ and 0.001–5.000 mol % of $Ta_2O_5$, and is characterized by containing 0.001–2.000 mol % in the form of oxide of at least one kind of element selected from the group consisting of Ga, Pt, Tl, Si, Ti, Cs, Au, S, Be, Al, Ca, Cd, In, Ba, Eu, Gd, Tb, Tm, Lu, Th, Ir, Os, Hf, Ru, Mg, Zr, Sn, Sb and.

THE BEST MODE FOR EMBODYING THE INVENTION

As a result of accumulating various experiments the inventors propose a voltage dependent non-linear resistance ceramic composition in a different system from the conventional composition by making strontium-titanate ($SrTiO_3$) as host material, and adding either one of $Nb_2O_5$ and $Ta_2O_5$ as semi-conductorization accelerating agent, and by further adding $MnO_2$ and appropriate amount of other additives; hereafter the present invention is described with respect to embodiments.

EXAMPLE 1

Figure 1:
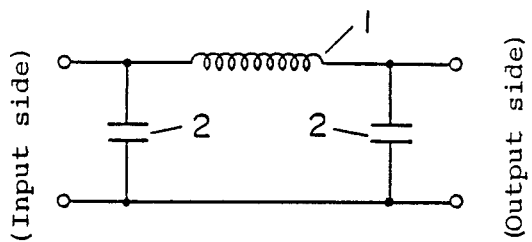
FIG. 1 is a circuit diagram of a general noise filter.
Figure 2:
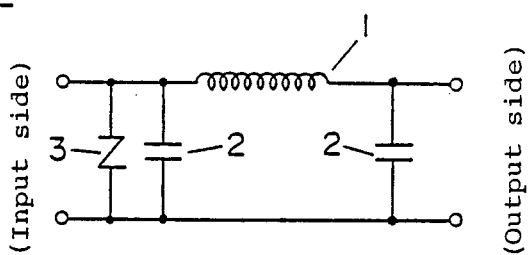
FIG. 2 is a circuit diagram of a noise filter using the conventional varistors and the capacitors.
Figure 3:
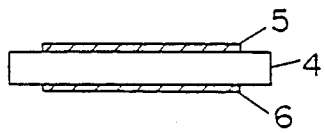
FIG. 3 is a sectional view of an element using voltage dependent non-linear resistance ceramic composition in accordance with the present invention.

After measuring $SrTiO_3$, $Nb_2O_5$, $Ta_2O_5$, $MnO_2$ and $Tl_2O$ to become composition ratio as shown in the below-mentioned Table 1, they are blended for 6 hours in wet method in a ball-mill or the like, and after drying is calcinated for 1–5 hours at 1000°–1250° C. in the air. Thereafter, after grinding for 4 hours in wet method in ball mill or the like and subsequently drying, and after granulating by adding 8 wt % of organic binder (for instance, polyvinylalcohol), press-forming to the size of 8.0 (mm) $\phi \times 1.0$ (mm) t with a pressing force of 1.0 t/cm². The granulated body is fired in a reducing atmosphere (for instance, $N_2:H_2=10:1$) at 1300°–1450° C. for 1–6 hours. The fired body thus obtained has a specific resistance of 0.1–0.8 $\Omega$.cm, and average granular size is 20–50 $\mu$m. Then, the dired body is further fired in air at 1000°–1300° C. for 0.5–5 hours, to obtain fired body 4 of FIG. 3. Furthermore, the both faces of the fired body 4 are ground with abrasive such as SiC and electrodes 5, 6 are formed by using a conductive metal such as Ag. Diameter of the above-mentioned electrodes 5, 6 are selected to be 5.0 (mm) $\phi$.

Characteristics of the element thus obtained are shown in Table 1.

Herein, evaluation of characteristics of the elements as varistor can be made by $\alpha$ and C in a voltage-current characteristic equation:

$$I = (V/C)^\alpha$$

(wherein I is current, V is voltage, C is a constant proper to the varistor and $\alpha$ is a non-linearity exponent). Since accurate measurement of C is difficult, in the present invention, characteristic assessment as varistor is made by the value of varistor voltage for unit thickness when 1 mA of varistor current is flowed (hereinafter is called as $V_{1mA}$/mm.) and by a value of $$\alpha = 1/\log (V_{10mA}/V_{1mA})$$

(wherein $V_{10mA}$ is a varistor voltage when a varistor current of 10 mA is flowed and $V_{1mA}$ is a varistor voltage when varistor current of 1 mA is flowed).

TABLE 1

| Sample No. | Composition ratio (mol %) | | | | | Characteristic value | | | |
|---|---|---|---|---|---|---|---|---|---|
| | $SrTiO_3$ | $Nb_2O_5$ | $Ta_2O_5$ | $MnO_2$ | $Tl_2O$ | $V_{1mA}$/mm (V) | $\alpha$ | $\epsilon$ | tan $\delta$ (%) |
| 1* | 99.795 | 0.100 | 0 | 0.100 | 0.005 | 1240 | 3.5 | $1 \times 10^3$ | 5.4 |
| 2* | 99.300 | 0.100 | 0 | 0.500 | 0.100 | 1460 | 5.7 | $1 \times 10^3$ | 10.9 |
| 3* | 99.899 | 0.100 | 0.001 | 0 | 0 | 90 | 3.0 | $1 \times 10^3$ | 4.2 |
| 4* | 99.898 | 0.100 | 0.001 | 0 | 0.001 | 110 | 4.2 | $1 \times 10^3$ | 3.6 |
| 5* | 99.799 | 0.100 | 0.001 | 0 | 0.100 | 117 | 4.9 | $2 \times 10^3$ | 3.0 |
| 6* | 97.899 | 0.100 | 0.001 | 0 | 2.000 | 135 | 5.6 | $2 \times 10^3$ | 3.0 |
| 7* | 96.899 | 0.100 | 0.001 | 0 | 3.000 | 175 | 5.5 | $2 \times 10^3$ | 4.6 |
| 8* | 99.898 | 0.100 | 0.001 | 0.001 | 0 | 100 | 5.7 | $4 \times 10^3$ | 4.1 |
| 9 | 99.897 | 0.100 | 0.001 | 0.001 | 0.001 | 120 | 8.6 | $8 \times 10^3$ | 3.5 |
| 10 | 99.798 | 0.100 | 0.001 | 0.001 | 0.100 | 128 | 9.7 | $9 \times 10^3$ | 3.0 |
| 11 | 97.799 | 0.100 | 0.001 | 0.001 | 2.000 | 142 | 9.7 | $9 \times 10^3$ | 2.9 |
| 12* | 96.799 | 0.100 | 0.001 | 0.001 | 3.000 | 164 | 9.5 | $5 \times 10^3$ | 3.9 |
| 13* | 98.899 | 0.100 | 0.001 | 1.000 | 0 | 150 | 8.2 | $4 \times 10^3$ | 4.5 |
| 14 | 98.898 | 0.100 | 0.001 | 1.000 | 0.001 | 157 | 8.7 | $8 \times 10^3$ | 4.0 |
| 15 | 98.799 | 0.100 | 0.001 | 1.000 | 0.100 | 167 | 9.6 | $9 \times 10^3$ | 3.4 |
| 16 | 96.899 | 0.100 | 0.001 | 1.000 | 2.000 | 173 | 9.8 | $1.0 \times 10^4$ | 3.0 |
| 17* | 95.899 | 0.100 | 0.001 | 1.000 | 3.000 | 182 | 9.2 | $6 \times 10^3$ | 7.1 |
| 18* | 97.899 | 0.100 | 0.001 | 2.000 | 0 | 190 | 8.8 | $5 \times 10^3$ | 10.1 |
| 19 | 97.898 | 0.100 | 0.001 | 2.000 | 0.001 | 198 | 8.0 | $9 \times 10^3$ | 10.1 |
| 20 | 97.799 | 0.100 | 0.001 | 2.000 | 0.100 | 202 | 8.7 | $9 \times 10^3$ | 9.3 |
| 21 | 95.899 | 0.100 | 0.001 | 2.000 | 2.000 | 204 | 8.7 | $1.0 \times 10^4$ | 8.9 |
| 22* | 94.899 | 0.100 | 0.001 | 2.000 | 3.000 | 255 | 7.9 | $5 \times 10^3$ | 7.8 |
| 23* | 98.899 | 0.100 | 1.000 | 0.001 | 0 | 90 | 8.0 | $4 \times 10^3$ | 4.0 |
| 24 | 98.898 | 0.100 | 1.000 | 0.001 | 0.001 | 100 | 9.2 | $8 \times 10^3$ | 2.7 |
| 25 | 98.799 | 0.100 | 1.000 | 0.001 | 0.100 | 111 | 11.3 | $9 \times 10^3$ | 2.3 |
| 26 | 96.899 | 0.100 | 1.000 | 0.001 | 2.000 | 127 | 11.6 | $1.1 \times 10^4$ | 2.3 |
| 27* | 95.899 | 0.100 | 1.000 | 0.001 | 3.000 | 156 | 9.1 | $6 \times 10^3$ | 6.3 |
| 28* | 97.900 | 0.100 | 1.000 | 1.000 | 0 | 130 | 8.2 | $5 \times 10^3$ | 4.2 |
| 29 | 97.899 | 0.100 | 1.000 | 1.000 | 0.001 | 147 | 9.2 | $8 \times 10^3$ | 2.9 |
| 30 | 97.800 | 0.100 | 1.000 | 1.000 | 0.100 | 156 | 12.0 | $9 \times 10^3$ | 2.5 |
| 31 | 95.900 | 0.100 | 1.000 | 1.000 | 2.000 | 162 | 11.5 | $1.1 \times 10^4$ | 2.3 |
| 32* | 94.900 | 0.100 | 1.000 | 1.000 | 3.000 | 175 | 9.0 | $7 \times 10^3$ | 5.4 |
| 33* | 96.900 | 0.100 | 1.000 | 2.000 | 0 | 180 | 8.0 | $6 \times 10^3$ | 10.0 |
| 34 | 96.899 | 0.100 | 1.000 | 2.000 | 0.001 | 198 | 8.0 | $7 \times 10^3$ | 9.5 |
| 35 | 96.800 | 0.100 | 1.000 | 2.000 | 0.100 | 213 | 8.1 | $7 \times 10^3$ | 9.0 |
| 36 | 94.900 | 0.100 | 1.000 | 2.000 | 2.000 | 233 | 8.5 | $7 \times 10^3$ | 8.9 |
| 37* | 93.900 | 0.100 | 1.000 | 2.000 | 3.000 | 260 | 7.9 | $8 \times 10^3$ | 8.8 |
| 38* | 94.899 | 0.100 | 5.000 | 0.001 | 0 | 75 | 7.2 | $7 \times 10^3$ | 3.8 |
| 39 | 94.898 | 0.100 | 5.000 | 0.001 | 0.001 | 85 | 7.7 | $7 \times 10^3$ | 3.0 |
| 40 | 94.799 | 0.100 | 5.000 | 0.001 | 0.100 | 96 | 9.3 | $8 \times 10^3$ | 2.5 |
| 41 | 92.899 | 0.100 | 5.000 | 0.001 | 2.000 | 112 | 9.8 | $9 \times 10^3$ | 2.4 |
| 42* | 91.899 | 0.100 | 5.000 | 0.001 | 3.000 | 127 | 9.0 | $5 \times 10^3$ | 3.5 |
| 43* | 93.900 | 0.100 | 5.000 | 1.000 | 0 | 82 | 7.6 | $7 \times 10^3$ | 3.9 |
| 44 | 93.899 | 0.100 | 5.000 | 1.000 | 0.001 | 94 | 8.4 | $9 \times 10^3$ | 2.6 |
| 45 | 93.800 | 0.100 | 5.000 | 1.000 | 0.100 | 112 | 10.2 | $1 \times 10^4$ | 2.5 |
| 46 | 91.900 | 0.100 | 5.000 | 1.000 | 2.000 | 115 | 10.1 | $1.1 \times 10^4$ | 2.5 |
| 47* | 90.900 | 0.100 | 5.000 | 1.000 | 3.000 | 139 | 9.5 | $6 \times 10^3$ | 4.3 |
| 48* | 92.900 | 0.100 | 5.000 | 2.000 | 0 | 95 | 8.4 | $7 \times 10^3$ | 9.4 |
| 49* | 92.899 | 0.100 | 5.000 | 2.000 | 0.001 | 121 | 9.1 | $7 \times 10^3$ | 9.3 |
| 50* | 92.800 | 0.100 | 5.000 | 2.000 | 0.100 | 131 | 10.2 | $8 \times 10^3$ | 9.0 |
| 51* | 90.900 | 0.100 | 5.000 | 2.000 | 2.000 | 138 | 10.2 | $8 \times 10^3$ | 8.6 |
| 52* | 89.900 | 0.100 | 5.000 | 2.000 | 3.000 | 195 | 8.5 | $4 \times 10^3$ | 9.2 |
| 53* | 92.899 | 0.100 | 7.000 | 0.001 | 0 | 40 | 4.0 | $6 \times 10^3$ | 6.2 |
| 54* | 92.898 | 0.100 | 7.000 | 0.001 | 0.001 | 60 | 4.3 | $6 \times 10^3$ | 6.1 |
| 55* | 92.799 | 0.100 | 7.000 | 0.001 | 0.100 | 63 | 4.3 | $6 \times 10^3$ | 5.9 |
| 56* | 90.899 | 0.100 | 7.000 | 0.001 | 2.000 | 69 | 4.5 | $6 \times 10^3$ | 5.9 |
| 57* | 89.899 | 0.100 | 7.000 | 0.001 | 3.000 | 102 | 4.7 | $5 \times 10^3$ | 7.8 |
| 58* | 91.900 | 0.100 | 7.000 | 1.000 | 0 | 49 | 4.4 | $6 \times 10^3$ | 10.2 |
| 59* | 91.899 | 0.100 | 7.000 | 1.000 | 0.001 | 75 | 4.8 | $6 \times 10^3$ | 10.1 |
| 60* | 91.800 | 0.100 | 7.000 | 1.000 | 0.100 | 81 | 5.2 | $6 \times 10^3$ | 10.0 |
| 61* | 89.900 | 0.100 | 7.000 | 1.000 | 2.000 | 93 | 5.8 | $5 \times 10^3$ | 9.8 |
| 62* | 88.900 | 0.100 | 7.000 | 1.000 | 3.000 | 124 | 5.0 | $4 \times 10^3$ | 9.9 |
| 63* | 95.800 | 0.100 | 1.000 | 3.000 | 0.100 | 211 | 4.2 | $5 \times 10^3$ | 23.1 |
| 64* | 92.900 | 0.100 | 1.000 | 3.000 | 3.000 | 244 | 5.3 | $4 \times 10^3$ | 21.0 |

*Comparison sample

And characteristic assessment as the capacitors are made by a dielectric constant $\epsilon$ and dielectric loss tan $\delta$ at a measurement frequency of 1 KHz. The above-mentioned data are those for firing temperature and time in the reducing atmosphere was 1400° C. and 2 hours, respectively and firing temperature and time in air was 1200° C. and 3 hours, respectively.

EXAMPLE 2

$SrTiO_3$, $Nb_2O_5$, $Ta_2O_5$, $MnO_2$ and $Y_2O_5$ are made in a composition ratio shown in the below-mentioned Table 2, and mixing, forming and firings are carried out in a similar operation as the above-mentioned EXAMPLE 1, and measurements are made in the similar conditions and results are shown in Table 2.

TABLE 2

| Sample No. | Composition ratio (mol %) | | | | | Characteristic value | | | |
|---|---|---|---|---|---|---|---|---|---|
| | $SrTiO_3$ | $Nb_2O_5$ | $Ta_2O_5$ | $MnO_2$ | $Y_2O_3$ | $V_1mA/mm$ (V) | $\alpha$ | $\epsilon$ | tan $\delta$ (%) |
| 1* | 99.795 | 0.100 | 0 | 0.100 | 0.005 | 1350 | 3.5 | $1 \times 10^3$ | 5.3 |
| 2* | 99.300 | 0.100 | 0 | 0.500 | 0.100 | 1530 | 5.2 | $3 \times 10^3$ | 9.2 |
| 3* | 99.899 | 0.100 | 0.001 | 0 | 0 | 90 | 3.0 | $1 \times 10^3$ | 4.2 |
| 4* | 99.898 | 0.100 | 0.001 | 0 | 0.001 | 102 | 4.0 | $1 \times 10^3$ | 2.7 |
| 5* | 99.799 | 0.100 | 0.001 | 0 | 0.100 | 110 | 4.7 | $2 \times 10^3$ | 2.0 |
| 6* | 97.899 | 0.100 | 0.001 | 0 | 2.000 | 130 | 5.7 | $3 \times 10^3$ | 2.1 |
| 7* | 96.899 | 0.100 | 0.001 | 0 | 3.000 | 162 | 5.8 | $2 \times 10^3$ | 2.2 |
| 8* | 99.898 | 0.100 | 0.001 | 0.001 | 0 | 100 | 5.7 | $4 \times 10^3$ | 4.1 |
| 9 | 99.897 | 0.100 | 0.001 | 0.001 | 0.001 | 105 | 8.4 | $8 \times 10^3$ | 2.6 |
| 10 | 99.798 | 0.100 | 0.001 | 0.001 | 0.100 | 114 | 9.5 | $9 \times 10^3$ | 2.0 |
| 11 | 97.799 | 0.100 | 0.001 | 0.001 | 2.000 | 138 | 9.7 | $1 \times 10^4$ | 2.0 |
| 12* | 96.799 | 0.100 | 0.001 | 0.001 | 3.000 | 152 | 10.1 | $6 \times 10^3$ | 2.8 |
| 13* | 98.899 | 0.100 | 0.001 | 1.000 | 0 | 150 | 8.2 | $4 \times 10^3$ | 4.5 |
| 14 | 98.898 | 0.100 | 0.001 | 1.000 | 0.001 | 155 | 8.5 | $9 \times 10^3$ | 3.1 |
| 15 | 98.799 | 0.100 | 0.001 | 1.000 | 0.100 | 164 | 9.4 | $1 \times 10^4$ | 2.6 |
| 16 | 96.899 | 0.100 | 0.001 | 1.000 | 2.000 | 173 | 10.0 | $1.1 \times 10^4$ | 2.2 |
| 17* | 95.899 | 0.100 | 0.001 | 1.000 | 3.000 | 178 | 10.4 | $6 \times 10^3$ | 2.0 |
| 18* | 97.899 | 0.100 | 0.001 | 2.000 | 0 | 190 | 8.8 | $5 \times 10^3$ | 10.1 |
| 19 | 97.898 | 0.100 | 0.001 | 2.000 | 0.001 | 210 | 8.7 | $9 \times 10^3$ | 9.0 |
| 20 | 97.799 | 0.100 | 0.001 | 2.000 | 0.100 | 218 | 9.3 | $1.1 \times 10^4$ | 8.9 |
| 21 | 95.899 | 0.100 | 0.001 | 2.000 | 2.000 | 232 | 10.2 | $1.1 \times 10^4$ | 7.9 |
| 22* | 94.899 | 0.100 | 0.001 | 2.000 | 3.000 | 260 | 10.0 | $8 \times 10^3$ | 6.8 |
| 23* | 98.899 | 0.100 | 1.000 | 0.001 | 0 | 90 | 8.0 | $4 \times 10^3$ | 4.0 |
| 24 | 98.898 | 0.100 | 1.000 | 0.001 | 0.001 | 95 | 8.9 | $9 \times 10^3$ | 2.9 |
| 25 | 98.799 | 0.100 | 1.000 | 0.001 | 0.100 | 103 | 11.2 | $1.0 \times 10^4$ | 2.0 |
| 26 | 96.899 | 0.100 | 1.000 | 0.001 | 2.000 | 125 | 11.8 | $1.1 \times 10^4$ | 2.0 |
| 27* | 95.899 | 0.100 | 1.000 | 0.001 | 3.000 | 149 | 10.1 | $7 \times 10^3$ | 2.1 |
| 28* | 97.900 | 0.100 | 1.000 | 1.000 | 0 | 130 | 8.2 | $5 \times 10^3$ | 4.2 |
| 29 | 97.899 | 0.100 | 1.000 | 1.000 | 0.001 | 140 | 9.0 | $9 \times 10^3$ | 3.0 |
| 30 | 97.800 | 0.100 | 1.000 | 1.000 | 0.100 | 149 | 11.8 | $1.2 \times 10^4$ | 2.2 |
| 31 | 95.900 | 0.100 | 1.000 | 1.000 | 2.000 | 152 | 11.6 | $1.4 \times 10^4$ | 2.0 |
| 32* | 94.900 | 0.100 | 1.000 | 1.000 | 3.000 | 168 | 9.5 | $6 \times 10^3$ | 2.0 |
| 33* | 96.900 | 0.100 | 1.000 | 2.000 | 0 | 180 | 8.0 | $6 \times 10^3$ | 10.0 |
| 34 | 96.899 | 0.100 | 1.000 | 2.000 | 0.001 | 192 | 8.3 | $8 \times 10^3$ | 9.0 |
| 35 | 96.800 | 0.100 | 1.000 | 2.000 | 0.100 | 209 | 8.4 | $1.1 \times 10^4$ | 8.9 |
| 36 | 94.900 | 0.100 | 1.000 | 2.000 | 2.000 | 213 | 8.9 | $1.4 \times 10^4$ | 8.8 |
| 37* | 93.900 | 0.100 | 1.000 | 2.000 | 3.000 | 255 | 9.1 | $5 \times 10^3$ | 8.3 |
| 38* | 94.899 | 0.100 | 5.000 | 0.001 | 0 | 75 | 7.2 | $7 \times 10^3$ | 3.8 |
| 39 | 94.898 | 0.100 | 5.000 | 0.001 | 0.001 | 84 | 7.4 | $9 \times 10^3$ | 2.7 |
| 40 | 94.799 | 0.100 | 5.000 | 0.001 | 0.100 | 95 | 9.0 | $9 \times 10^3$ | 2.4 |
| 41 | 92.899 | 0.100 | 5.000 | 0.001 | 2.000 | 112 | 10.0 | $1.1 \times 10^4$ | 2.0 |
| 42* | 91.899 | 0.100 | 5.000 | 0.001 | 3.000 | 121 | 10.2 | $6 \times 10^3$ | 2.0 |
| 43* | 93.900 | 0.100 | 5.000 | 1.000 | 0 | 82 | 7.6 | $7 \times 10^3$ | 3.9 |
| 44 | 93.899 | 0.100 | 5.000 | 1.000 | 0.001 | 95 | 8.1 | $1 \times 10^4$ | 2.8 |
| 45 | 93.800 | 0.100 | 5.000 | 1.000 | 0.100 | 102 | 9.9 | $1.2 \times 10^4$ | 2.6 |
| 46 | 91.900 | 0.100 | 5.000 | 1.000 | 2.000 | 109 | 10.2 | $1.1 \times 10^4$ | 2.3 |
| 47* | 90.900 | 0.100 | 5.000 | 1.000 | 3.000 | 123 | 10.5 | $5 \times 10^3$ | 2.2 |
| 48* | 92.900 | 0.100 | 5.000 | 2.000 | 0 | 95 | 8.4 | $7 \times 10^3$ | 9.4 |
| 49 | 92.899 | 0.100 | 5.000 | 2.000 | 0.001 | 108 | 9.0 | $8 \times 10^3$ | 9.3 |
| 50 | 92.800 | 0.100 | 5.000 | 2.000 | 0.100 | 119 | 10.8 | $9 \times 10^3$ | 8.0 |
| 51 | 90.900 | 0.100 | 5.000 | 2.000 | 2.000 | 124 | 12.0 | $1 \times 10^4$ | 8.0 |
| 52* | 89.900 | 0.100 | 5.000 | 2.000 | 3.000 | 148 | 10.1 | $7 \times 10^3$ | 7.2 |
| 53* | 92.899 | 0.100 | 7.000 | 0.001 | 0 | 40 | 4.0 | $6 \times 10^3$ | 6.2 |
| 54* | 92.898 | 0.100 | 7.000 | 0.001 | 0.001 | 53 | 4.2 | $7 \times 10^3$ | 6.1 |
| 55* | 92.799 | 0.100 | 7.000 | 0.001 | 0.100 | 56 | 4.3 | $8 \times 10^3$ | 5.8 |
| 56* | 90.899 | 0.100 | 7.000 | 0.001 | 2.000 | 64 | 6.0 | $8 \times 10^3$ | 6.0 |
| 57* | 89.899 | 0.100 | 7.000 | 0.001 | 3.000 | 71 | 5.3 | $7 \times 10^3$ | 5.9 |
| 58* | 91.900 | 0.100 | 7.000 | 1.000 | 0 | 49 | 4.4 | $6 \times 10^3$ | 10.2 |
| 59* | 91.988 | 0.100 | 7.000 | 1.000 | 0.001 | 60 | 4.4 | $8 \times 10^3$ | 9.2 |
| 60* | 91.800 | 0.100 | 7.000 | 1.000 | 0.100 | 64 | 5.0 | $8 \times 10^3$ | 8.9 |
| 61* | 89.900 | 0.100 | 7.000 | 1.000 | 2.000 | 84 | 7.0 | $7 \times 10^3$ | 9.0 |
| 62* | 88.900 | 0.100 | 7.000 | 1.000 | 3.000 | 92 | 6.0 | $7 \times 10^3$ | 9.1 |
| 63* | 95.800 | 0.100 | 1.000 | 3.000 | 0.100 | 194 | 7.2 | $4 \times 10^3$ | 19.2 |
| 64* | 92.900 | 0.100 | 1.000 | 3.000 | 3.000 | 281 | 6.6 | $3 \times 10^3$ | 18.0 |

*Comparison sample

EXAMPLE 3

$SrTiO_3$, $Nb_2O_5$, $Ta_2O_5$, $MnO_2$ and BaO are made in a composition ratio shown in the below-mentioned Table 3, and mixing, forming and firings are carried out in a similar operation as the above-mentioned Example 1, and measurements are made in the similar conditions and results are shown in Table 3.

Table 4, and mixing, forming and firings are carried out in a similar operation as the above-mentioned Example

TABLE 3

| Sample No. | Composition ratio (mol %) | | | | | Characteristic value | | | |
|---|---|---|---|---|---|---|---|---|---|
| | SrTiO₃ | Nb₂O₅ | Ta₂O₅ | MnO₂ | BaO | V₁mA/mm (V) | α | ε | tan δ (%) |
| 1* | 99.795 | 0.100 | 0 | 0.100 | 0.005 | 1300 | 3.4 | $1 \times 10^3$ | 5.2 |
| 2* | 99.300 | 0.100 | 0 | 0.500 | 0.100 | 1550 | 5.0 | $2 \times 10^3$ | 8.3 |
| 3* | 99.899 | 0.100 | 0.001 | 0 | 0 | 90 | 3.0 | $1 \times 10^3$ | 4.2 |
| 4* | 99.898 | 0.100 | 0.001 | 0 | 0.001 | 98 | 4.1 | $1 \times 10^3$ | 2.8 |
| 5* | 99.799 | 0.100 | 0.001 | 0 | 0.100 | 105 | 4.8 | $3 \times 10^3$ | 2.1 |
| 6* | 97.899 | 0.100 | 0.001 | 0 | 2.000 | 121 | 5.6 | $3 \times 10^3$ | 2.0 |
| 7* | 96.899 | 0.100 | 0.001 | 0 | 3.000 | 155 | 5.9 | $1 \times 10^3$ | 1.9 |
| 8* | 99.898 | 0.100 | 0.001 | 0.001 | 0 | 100 | 5.7 | $4 \times 10^3$ | 4.1 |
| 9 | 99.897 | 0.100 | 0.001 | 0.001 | 0.001 | 102 | 8.6 | $8 \times 10^3$ | 2.7 |
| 10 | 99.798 | 0.100 | 0.001 | 0.001 | 0.100 | 111 | 9.8 | $8 \times 10^3$ | 2.0 |
| 11 | 97.799 | 0.100 | 0.001 | 0.001 | 2.000 | 135 | 10.5 | $9 \times 10^3$ | 2.0 |
| 12* | 96.799 | 0.100 | 0.001 | 0.001 | 3.000 | 150 | 11.2 | $5 \times 10^3$ | 2.0 |
| 13* | 98.899 | 0.100 | 0.001 | 1.000 | 0 | 150 | 8.2 | $4 \times 10^3$ | 4.5 |
| 14 | 98.898 | 0.100 | 0.001 | 1.000 | 0.001 | 152 | 8.9 | $8 \times 10^3$ | 3.0 |
| 15 | 98.799 | 0.100 | 0.001 | 1.000 | 0.100 | 160 | 10.1 | $9 \times 10^3$ | 2.6 |
| 16 | 96.899 | 0.100 | 0.001 | 1.000 | 2.000 | 168 | 11.4 | $1 \times 10^4$ | 2.3 |
| 17* | 95.899 | 0.100 | 0.001 | 1.000 | 3.000 | 172 | 11.8 | $5 \times 10^3$ | 2.2 |
| 18* | 97.899 | 0.100 | 0.001 | 2.000 | 0 | 190 | 8.8 | $5 \times 10^3$ | 10.1 |
| 19 | 97.898 | 0.100 | 0.001 | 2.000 | 0.001 | 205 | 9.0 | $9 \times 10^3$ | 9.2 |
| 20 | 97.799 | 0.100 | 0.001 | 2.000 | 0.100 | 215 | 10.4 | $1.1 \times 10^4$ | 9.1 |
| 21 | 95.899 | 0.100 | 0.001 | 2.000 | 2.000 | 230 | 11.9 | $1 \times 10^4$ | 8.0 |
| 22* | 94.899 | 0.100 | 0.001 | 2.000 | 3.000 | 254 | 10.5 | $7 \times 10^3$ | 6.9 |
| 23* | 98.899 | 0.100 | 1.000 | 0.001 | 0 | 90 | 8.0 | $4 \times 10^3$ | 4.0 |
| 24 | 98.898 | 0.100 | 1.000 | 0.001 | 0.001 | 93 | 9.1 | $8 \times 10^3$ | 2.8 |
| 25 | 98.799 | 0.100 | 1.000 | 0.001 | 0.100 | 100 | 11.4 | $9 \times 10^3$ | 2.6 |
| 26 | 96.899 | 0.100 | 1.000 | 0.001 | 2.000 | 120 | 12.0 | $1 \times 10^4$ | 2.5 |
| 27* | 95.899 | 0.100 | 1.000 | 0.001 | 3.000 | 140 | 10.1 | $6 \times 10^3$ | 2.3 |
| 28* | 97.900 | 0.100 | 1.000 | 1.000 | 0 | 130 | 8.2 | $5 \times 10^3$ | 4.2 |
| 29 | 97.899 | 0.100 | 1.000 | 1.000 | 0.001 | 135 | 9.3 | $9 \times 10^3$ | 2.9 |
| 30 | 97.800 | 0.100 | 1.000 | 1.000 | 0.100 | 148 | 12.1 | $1.1 \times 10^4$ | 2.1 |
| 31 | 95.900 | 0.100 | 1.000 | 1.000 | 2.000 | 150 | 11.8 | $1.3 \times 10^4$ | 2.1 |
| 32* | 94.900 | 0.100 | 1.000 | 1.000 | 3.000 | 164 | 10.0 | $6 \times 10^3$ | 2.0 |
| 33* | 96.900 | 0.100 | 1.000 | 2.000 | 0 | 180 | 8.0 | $6 \times 10^3$ | 10.0 |
| 34 | 96.899 | 0.100 | 1.000 | 2.000 | 0.001 | 190 | 8.5 | $8 \times 10^3$ | 9.2 |
| 35 | 96.800 | 0.100 | 1.000 | 2.000 | 0.100 | 204 | 8.9 | $1 \times 10^4$ | 9.0 |
| 36 | 94.900 | 0.100 | 1.000 | 2.000 | 2.000 | 210 | 9.4 | $1.3 \times 10^4$ | 8.8 |
| 37* | 93.900 | 0.100 | 1.000 | 2.000 | 3.000 | 245 | 9.5 | $8 \times 10^3$ | 8.1 |
| 38* | 94.899 | 0.100 | 5.000 | 0.001 | 0 | 75 | 7.2 | $7 \times 10^3$ | 3.8 |
| 39 | 94.898 | 0.100 | 5.000 | 0.001 | 0.001 | 81 | 7.9 | $9 \times 10^3$ | 2.9 |
| 40 | 94.799 | 0.100 | 5.000 | 0.001 | 0.100 | 85 | 9.9 | $1 \times 10^4$ | 2.5 |
| 41 | 92.899 | 0.100 | 5.000 | 0.001 | 2.000 | 100 | 10.4 | $1.2 \times 10^4$ | 2.1 |
| 42* | 91.899 | 0.100 | 5.000 | 0.001 | 3.000 | 115 | 11.0 | $6 \times 10^3$ | 2.0 |
| 43* | 93.900 | 0.100 | 5.000 | 1.000 | 0 | 82 | 7.6 | $7 \times 10^3$ | 3.9 |
| 44 | 93.899 | 0.100 | 5.000 | 1.000 | 0.001 | 85 | 8.3 | $9 \times 10^3$ | 2.9 |
| 45 | 93.800 | 0.100 | 5.000 | 1.000 | 0.100 | 97 | 10.1 | $1.1 \times 10^4$ | 2.6 |
| 46 | 91.900 | 0.100 | 5.000 | 1.000 | 2.000 | 108 | 11.2 | $1 \times 10^4$ | 2.2 |
| 47* | 90.900 | 0.100 | 5.000 | 1.000 | 3.000 | 120 | 10.7 | $5 \times 10^3$ | 2.1 |
| 48* | 92.900 | 0.100 | 5.000 | 2.000 | 0 | 95 | 8.4 | $7 \times 10^3$ | 9.4 |
| 49 | 92.899 | 0.100 | 5.000 | 2.000 | 0.001 | 102 | 9.2 | $8 \times 10^3$ | 9.3 |
| 50 | 92.800 | 0.100 | 5.000 | 2.000 | 0.100 | 114 | 11.0 | $1 \times 10^4$ | 8.1 |
| 51 | 90.900 | 0.100 | 5.000 | 2.000 | 2.000 | 123 | 12.3 | $1 \times 10^4$ | 8.0 |
| 52* | 89.900 | 0.100 | 5.000 | 2.000 | 3.000 | 147 | 10.4 | $7 \times 10^3$ | 7.4 |
| 53* | 92.899 | 0.100 | 7.000 | 0.001 | 0 | 40 | 4.0 | $6 \times 10^3$ | 6.2 |
| 54* | 92.898 | 0.100 | 7.000 | 0.001 | 0.001 | 43 | 4.4 | $7 \times 10^3$ | 6.0 |
| 55* | 92.799 | 0.100 | 7.000 | 0.001 | 0.100 | 49 | 4.5 | $8 \times 10^3$ | 5.8 |
| 56* | 90.899 | 0.100 | 7.000 | 0.001 | 2.000 | 52 | 6.2 | $9 \times 10^3$ | 5.9 |
| 57* | 89.899 | 0.100 | 7.000 | 0.001 | 3.000 | 69 | 5.8 | $7 \times 10^3$ | 5.8 |
| 58* | 91.900 | 0.100 | 7.000 | 1.000 | 0 | 49 | 4.4 | $6 \times 10^3$ | 10.2 |
| 59* | 91.899 | 0.100 | 7.000 | 1.000 | 0.001 | 55 | 4.8 | $8 \times 10^3$ | 9.4 |
| 60* | 91.800 | 0.100 | 7.000 | 1.000 | 0.100 | 62 | 5.5 | $8 \times 10^3$ | 9.1 |
| 61* | 89.900 | 0.100 | 7.000 | 1.000 | 2.000 | 84 | 7.2 | $8 \times 10^3$ | 9.0 |
| 62* | 88.900 | 0.100 | 7.000 | 1.000 | 3.000 | 93 | 6.1 | $7 \times 10^3$ | 8.5 |
| 63* | 95.800 | 0.100 | 1.000 | 3.000 | 0.100 | 131 | 8.2 | $5 \times 10^3$ | 19.7 |
| 64* | 92.900 | 0.100 | 1.000 | 3.000 | 3.000 | 249 | 9.1 | $4 \times 10^3$ | 18.0 |

*Comparison sample

EXAMPLE 4

SrTiO₃, Nb₂O₅, Ta₂O₅, MnO₂ and HfO₂ are made in a composition ratio shown in the below-mentioned 1, and measurements are made in the similar conditions and results are shown in Table 4.

TABLE 4

| Sample No. | Composition ratio (mol %) | | | | | Characteristic value | | | |
|---|---|---|---|---|---|---|---|---|---|
| | SrTiO₃ | Nb₂O₅ | Ta₂O₅ | MnO₂ | HfO₂ | V₁mA/mm (V) | α | ε | tan δ (%) |
| 1* | 99.795 | 0.100 | 0 | 0.100 | 0.005 | 1220 | 3.5 | $1 \times 10^3$ | 6.4 |

TABLE 4-continued

| Sample No. | Composition ratio (mol %) | | | | | Characteristic value | | | |
|---|---|---|---|---|---|---|---|---|---|
| | $SrTiO_3$ | $Nb_2O_5$ | $Ta_2O_5$ | $MnO_2$ | $HfO_2$ | $V_1mA/mm$ (V) | $\alpha$ | $\epsilon$ | $\tan \delta$ (%) |
| 2* | 99.300 | 0.100 | 0 | 0.500 | 0.100 | 1470 | 5.6 | $2 \times 10^3$ | 11.8 |
| 3* | 99.899 | 0.100 | 0.001 | 0 | 0 | 90 | 3.0 | $1 \times 10^3$ | 4.2 |
| 4* | 99.898 | 0.100 | 0.001 | 0 | 0.001 | 130 | 4.2 | $1 \times 10^3$ | 3.9 |
| 5* | 99.799 | 0.100 | 0.001 | 0 | 0.100 | 135 | 4.9 | $2 \times 10^3$ | 3.3 |
| 6* | 97.899 | 0.100 | 0.001 | 0 | 2.000 | 137 | 5.5 | $4 \times 10^3$ | 3.0 |
| 7* | 96.899 | 0.100 | 0.001 | 0 | 3.000 | 194 | 5.4 | $3 \times 10^3$ | 4.5 |
| 8* | 99.898 | 0.100 | 0.001 | 0.001 | 0 | 100 | 5.7 | $4 \times 10^3$ | 4.1 |
| 9 | 99.897 | 0.100 | 0.001 | 0.001 | 0.001 | 135 | 8.6 | $8 \times 10^3$ | 3.7 |
| 10 | 99.798 | 0.100 | 0.001 | 0.001 | 0.100 | 142 | 9.7 | $9 \times 10^3$ | 3.2 |
| 11 | 97.799 | 0.100 | 0.001 | 0.001 | 2.000 | 160 | 9.8 | $9 \times 10^3$ | 2.9 |
| 12* | 96.799 | 0.100 | 0.001 | 0.001 | 3.000 | 184 | 9.4 | $5 \times 10^3$ | 3.8 |
| 13* | 98.899 | 0.100 | 0.001 | 1.000 | 0 | 150 | 8.2 | $4 \times 10^3$ | 4.5 |
| 14 | 98.898 | 0.100 | 0.001 | 1.000 | 0.001 | 172 | 8.8 | $9 \times 10^3$ | 4.1 |
| 15 | 98.799 | 0.100 | 0.001 | 1.000 | 0.100 | 181 | 9.7 | $9 \times 10^3$ | 3.5 |
| 16 | 96.899 | 0.100 | 0.001 | 1.000 | 2.000 | 185 | 9.9 | $1.1 \times 10^4$ | 3.0 |
| 17* | 95.899 | 0.100 | 0.001 | 1.000 | 3.000 | 202 | 9.1 | $6 \times 10^3$ | 7.2 |
| 18* | 97.899 | 0.100 | 0.001 | 2.000 | 0 | 190 | 8.8 | $5 \times 10^3$ | 10.1 |
| 19 | 97.898 | 0.100 | 0.001 | 2.000 | 0.001 | 208 | 8.0 | $9 \times 10^3$ | 10.0 |
| 20 | 97.799 | 0.100 | 0.001 | 2.000 | 0.100 | 219 | 8.6 | $1 \times 10^4$ | 9.2 |
| 21 | 95.899 | 0.100 | 0.001 | 2.000 | 2.000 | 224 | 8.5 | $1.1 \times 10^4$ | 8.9 |
| 22* | 94.899 | 0.100 | 0.001 | 2.000 | 3.000 | 275 | 7.8 | $6 \times 10^3$ | 7.9 |
| 23* | 98.899 | 0.100 | 1.000 | 0.001 | 0 | 90 | 8.0 | $4 \times 10^3$ | 4.0 |
| 24 | 98.898 | 0.100 | 1.000 | 0.001 | 0.001 | 114 | 9.2 | $9 \times 10^3$ | 2.8 |
| 25 | 98.799 | 0.100 | 1.000 | 0.001 | 0.100 | 127 | 11.3 | $1 \times 10^4$ | 2.3 |
| 26 | 96.899 | 0.100 | 1.000 | 0.001 | 2.000 | 141 | 11.5 | $1.1 \times 10^4$ | 2.3 |
| 27* | 95.899 | 0.100 | 1.000 | 0.001 | 3.000 | 176 | 9.0 | $6 \times 10^3$ | 6.4 |
| 28* | 97.900 | 0.100 | 1.000 | 1.000 | 0 | 130 | 8.2 | $5 \times 10^3$ | 4.2 |
| 29 | 97.899 | 0.100 | 1.000 | 1.000 | 0.001 | 159 | 9.2 | $9 \times 10^3$ | 3.0 |
| 30 | 97.800 | 0.100 | 1.000 | 1.000 | 0.100 | 169 | 12.0 | $9 \times 10^3$ | 2.6 |
| 31 | 95.900 | 0.100 | 1.000 | 1.000 | 2.000 | 175 | 11.4 | $1.1 \times 10^4$ | 2.3 |
| 32* | 94.900 | 0.100 | 1.000 | 1.000 | 3.000 | 200 | 9.1 | $7 \times 10^3$ | 5.5 |
| 33* | 96.900 | 0.100 | 1.000 | 2.000 | 0 | 180 | 8.0 | $6 \times 10^3$ | 10.0 |
| 34 | 96.899 | 0.100 | 1.000 | 2.000 | 0.001 | 205 | 8.0 | $7 \times 10^3$ | 9.6 |
| 35 | 96.800 | 0.100 | 1.000 | 2.000 | 0.100 | 221 | 8.0 | $7 \times 10^3$ | 9.1 |
| 36 | 94.900 | 0.100 | 1.000 | 2.000 | 2.000 | 245 | 8.1 | $8 \times 10^3$ | 8.9 |
| 37* | 93.900 | 0.100 | 1.000 | 2.000 | 3.000 | 280 | 6.8 | $9 \times 10^3$ | 8.9 |
| 38* | 94.899 | 0.100 | 5.000 | 0.001 | 0 | 75 | 7.2 | $7 \times 10^4$ | 3.8 |
| 39 | 94.898 | 0.100 | 5.000 | 0.001 | 0.001 | 100 | 7.8 | $7 \times 10^3$ | 3.2 |
| 40 | 94.799 | 0.100 | 5.000 | 0.001 | 0.100 | 106 | 9.4 | $8 \times 10^3$ | 2.7 |
| 41 | 92.899 | 0.100 | 5.000 | 0.001 | 2.000 | 130 | 9.8 | $9 \times 10^3$ | 2.4 |
| 42* | 91.899 | 0.100 | 5.000 | 0.001 | 3.000 | 147 | 8.9 | $4 \times 10^3$ | 3.6 |
| 43* | 93.900 | 0.100 | 5.000 | 1.000 | 0 | 82 | 7.6 | $7 \times 10^3$ | 3.9 |
| 44 | 93.899 | 0.100 | 5.000 | 1.000 | 0.001 | 109 | 8.5 | $9 \times 10^3$ | 2.8 |
| 45 | 93.800 | 0.100 | 5.000 | 1.000 | 0.100 | 125 | 10.3 | $1.1 \times 10^4$ | 2.7 |
| 46 | 91.900 | 0.100 | 5.000 | 1.000 | 2.000 | 135 | 10.2 | $1.2 \times 10^4$ | 2.5 |
| 47* | 90.900 | 0.100 | 5.000 | 1.000 | 3.000 | 169 | 9.3 | $6 \times 10^3$ | 4.4 |
| 48* | 92.900 | 0.100 | 5.000 | 2.000 | 0 | 95 | 8.4 | $7 \times 10^3$ | 9.4 |
| 49* | 92.899 | 0.100 | 5.000 | 2.000 | 0.001 | 135 | 9.0 | $7 \times 10^3$ | 9.4 |
| 50* | 92.800 | 0.100 | 5.000 | 2.000 | 0.100 | 142 | 10.1 | $8 \times 10^3$ | 9.1 |
| 51* | 90.900 | 0.100 | 5.000 | 2.000 | 2.000 | 158 | 10.0 | $8 \times 10^3$ | 8.6 |
| 52* | 89.900 | 0.100 | 5.000 | 2.000 | 3.000 | 211 | 8.2 | $4 \times 10^3$ | 9.3 |
| 53* | 92.899 | 0.100 | 7.000 | 0.001 | 0 | 40 | 4.0 | $6 \times 10^3$ | 6.2 |
| 54* | 92.898 | 0.100 | 7.000 | 0.001 | 0.001 | 71 | 4.4 | $7 \times 10^3$ | 6.2 |
| 55* | 92.799 | 0.100 | 7.000 | 0.001 | 0.100 | 78 | 4.3 | $6 \times 10^3$ | 6.0 |
| 56* | 90.899 | 0.100 | 7.000 | 0.001 | 2.000 | 89 | 4.3 | $6 \times 10^3$ | 5.9 |
| 57* | 89.899 | 0.100 | 7.000 | 0.001 | 3.000 | 128 | 4.0 | $6 \times 10^3$ | 7.9 |
| 58* | 91.900 | 0.100 | 7.000 | 1.000 | 0 | 49 | 4.4 | $6 \times 10^3$ | 10.2 |
| 59* | 91.899 | 0.100 | 7.000 | 1.000 | 0.001 | 88 | 4.8 | $7 \times 10^3$ | 10.2 |
| 60* | 91.800 | 0.100 | 7.000 | 1.000 | 0.100 | 91 | 5.1 | $6 \times 10^3$ | 10.1 |
| 61* | 89.900 | 0.100 | 7.000 | 1.000 | 2.000 | 104 | 5.0 | $6 \times 10^3$ | 10.0 |
| 62* | 88.900 | 0.100 | 7.000 | 1.000 | 3.000 | 144 | 4.2 | $4 \times 10^3$ | 10.0 |
| 63* | 95.800 | 0.100 | 1.000 | 3.000 | 0.100 | 215 | 6.2 | $4 \times 10^3$ | 28.0 |
| 64* | 92.900 | 0.100 | 1.000 | 3.000 | 3.000 | 272 | 5.0 | $4 \times 10^3$ | 22.4 |

*Comparison sample

EXAMPLE 5

$SrTiO_3$, $Nb_2O_5$, $Ta_2O_5$, $MnO_2$ and $ZrO_2$ are made in a composition ratio shown in the below-mentioned Table 5, and mixing, forming and firings are carried out in a similar operation as the above-mentioned Example 1, and measurements are made in the similar conditions and results are shown in Table 5.

TABLE 5

| Sample No. | Composition ratio (mol %) | | | | | Characteristic value | | | |
|---|---|---|---|---|---|---|---|---|---|
| | $SrTiO_3$ | $Nb_2O_5$ | $Ta_2O_5$ | $MnO_2$ | $ZrO_2$ | $V_1mA/mm$ (V) | $\alpha$ | $\epsilon$ | $\tan \delta$ (%) |
| 1* | 99.795 | 0.100 | 0 | 0.100 | 0.005 | 1340 | 3.4 | $1 \times 10^3$ | 6.4 |
| 2* | 99.300 | 0.100 | 0 | 0.500 | 0.100 | 1520 | 5.5 | $2 \times 10^3$ | 11.4 |
| 3* | 99.899 | 0.100 | 0.001 | 0 | 0 | 90 | 3.0 | $1 \times 10^3$ | 4.2 |
| 4* | 99.898 | 0.100 | 0.001 | 0 | 0.001 | 105 | 4.1 | $1 \times 10^3$ | 3.7 |

TABLE 5-continued

| Sample No. | Composition ratio (mol %) | | | | | Characteristic value | | | |
|---|---|---|---|---|---|---|---|---|---|
| | $SrTiO_3$ | $Nb_2O_5$ | $Ta_2O_5$ | $MnO_2$ | $ZrO_2$ | $V_1 mA/mm$ (V) | $\alpha$ | $\epsilon$ | tan $\delta$ (%) |
| 5* | 99.799 | 0.100 | 0.001 | 0 | 0.100 | 112 | 4.8 | $2 \times 10^3$ | 3.0 |
| 6* | 97.899 | 0.100 | 0.001 | 0 | 2.000 | 134 | 5.6 | $2 \times 10^3$ | 3.0 |
| 7* | 96.899 | 0.100 | 0.001 | 0 | 3.000 | 174 | 5.7 | $3 \times 10^3$ | 4.5 |
| 8* | 99.898 | 0.100 | 0.001 | 0.001 | 0 | 100 | 5.7 | $4 \times 10^3$ | 4.1 |
| 9 | 99.897 | 0.100 | 0.001 | 0.001 | 0.001 | 115 | 8.5 | $7 \times 10^3$ | 3.6 |
| 10 | 99.798 | 0.100 | 0.001 | 0.001 | 0.100 | 123 | 9.6 | $9 \times 10^3$ | 3.0 |
| 11 | 97.799 | 0.100 | 0.001 | 0.001 | 2.000 | 141 | 9.7 | $9 \times 10^3$ | 2.9 |
| 12* | 96.799 | 0.100 | 0.001 | 0.001 | 3.000 | 163 | 10.0 | $5 \times 10^3$ | 3.8 |
| 13* | 98.899 | 0.100 | 0.001 | 1.000 | 0 | 150 | 8.2 | $4 \times 10^3$ | 4.5 |
| 14 | 98.898 | 0.100 | 0.001 | 1.000 | 0.001 | 152 | 8.6 | $8 \times 10^3$ | 4.1 |
| 15 | 98.799 | 0.100 | 0.001 | 1.000 | 0.100 | 163 | 9.5 | $9 \times 10^3$ | 3.5 |
| 16 | 96.899 | 0.100 | 0.001 | 1.000 | 2.000 | 172 | 9.9 | $1 \times 10^4$ | 3.0 |
| 17* | 95.899 | 0.100 | 0.001 | 1.000 | 3.000 | 181 | 9.4 | $6 \times 10^3$ | 7.0 |
| 18* | 97.899 | 0.100 | 0.001 | 2.000 | 0 | 190 | 8.8 | $5 \times 10^3$ | 10.1 |
| 19 | 97.898 | 0.100 | 0.001 | 2.000 | 0.001 | 193 | 8.2 | $9 \times 10^3$ | 10.0 |
| 20 | 97.799 | 0.100 | 0.001 | 2.000 | 0.100 | 198 | 9.0 | $1 \times 10^4$ | 9.2 |
| 21 | 95.899 | 0.100 | 0.001 | 2.000 | 2.000 | 203 | 9.7 | $1.1 \times 10^4$ | 8.7 |
| 22* | 94.899 | 0.100 | 0.001 | 2.000 | 3.000 | 254 | 9.7 | $6 \times 10^3$ | 7.4 |
| 23* | 98.899 | 0.100 | 1.000 | 0.001 | 0 | 90 | 8.0 | $4 \times 10^3$ | 4.0 |
| 24 | 98.898 | 0.100 | 1.000 | 0.001 | 0.001 | 97 | 9.1 | $8 \times 10^3$ | 2.8 |
| 25 | 97.799 | 0.100 | 1.000 | 0.001 | 0.100 | 104 | 11.2 | $9 \times 10^3$ | 2.4 |
| 26 | 96.899 | 0.100 | 1.000 | 0.001 | 2.000 | 126 | 11.7 | $1 \times 10^4$ | 2.3 |
| 27* | 95.899 | 0.100 | 1.000 | 0.001 | 3.000 | 155 | 10.0 | $6 \times 10^3$ | 6.1 |
| 28* | 97.900 | 0.100 | 1.000 | 1.000 | 0 | 130 | 8.2 | $5 \times 10^3$ | 4.2 |
| 29 | 97.899 | 0.100 | 1.000 | 1.000 | 0.001 | 143 | 9.1 | $9 \times 10^3$ | 3.0 |
| 30 | 97.800 | 0.100 | 1.000 | 1.000 | 0.100 | 151 | 11.9 | $1 \times 10^4$ | 2.4 |
| 31 | 95.900 | 0.100 | 1.000 | 1.000 | 2.000 | 155 | 11.5 | $1.1 \times 10^4$ | 2.2 |
| 32* | 94.900 | 0.100 | 1.000 | 1.000 | 3.000 | 174 | 9.4 | $7 \times 10^3$ | 5.4 |
| 33* | 96.900 | 0.100 | 1.000 | 2.000 | 0 | 180 | 8.0 | $6 \times 10^3$ | 10.0 |
| 34 | 96.899 | 0.100 | 1.000 | 2.000 | 0.001 | 194 | 8.1 | $7 \times 10^3$ | 9.4 |
| 35 | 96.800 | 0.100 | 1.000 | 2.000 | 0.100 | 209 | 8.2 | $7 \times 10^3$ | 8.9 |
| 36 | 94.900 | 0.100 | 1.000 | 2.000 | 2.000 | 231 | 8.7 | $8 \times 10^3$ | 8.8 |
| 37* | 93.900 | 0.100 | 1.000 | 2.000 | 3.000 | 258 | 8.9 | $5 \times 10^3$ | 8.8 |
| 38* | 94.899 | 0.100 | 5.000 | 0.001 | 0 | 75 | 7.2 | $7 \times 10^3$ | 3.8 |
| 39 | 94.898 | 0.100 | 5.000 | 0.001 | 0.001 | 83 | 7.6 | $8 \times 10^3$ | 2.9 |
| 40 | 94.799 | 0.100 | 5.000 | 0.001 | 0.100 | 94 | 9.2 | $9 \times 10^3$ | 2.4 |
| 41 | 92.899 | 0.100 | 5.000 | 0.001 | 2.000 | 110 | 9.9 | $1 \times 10^4$ | 2.3 |
| 42* | 91.899 | 0.100 | 5.000 | 0.001 | 3.000 | 126 | 10.0 | $6 \times 10^3$ | 3.6 |
| 43* | 93.900 | 0.100 | 5.000 | 1.000 | 0 | 82 | 7.6 | $7 \times 10^3$ | 3.9 |
| 44 | 93.899 | 0.100 | 5.000 | 1.000 | 0.001 | 93 | 8.3 | $9 \times 10^3$ | 2.7 |
| 45 | 93.800 | 0.100 | 5.000 | 1.000 | 0.100 | 100 | 10.1 | $1 \times 10^4$ | 2.6 |
| 46 | 91.900 | 0.100 | 5.000 | 1.000 | 2.000 | 107 | 10.0 | $9 \times 10^3$ | 2.6 |
| 47* | 90.900 | 0.100 | 5.000 | 1.000 | 3.000 | 134 | 9.7 | $5 \times 10^3$ | 4.2 |
| 48* | 92.900 | 0.100 | 5.000 | 2.000 | 0 | 95 | 8.4 | $7 \times 10^3$ | 9.4 |
| 49* | 92.899 | 0.100 | 5.000 | 2.000 | 0.001 | 112 | 9.0 | $7 \times 10^3$ | 9.4 |
| 50* | 92.800 | 0.100 | 5.000 | 2.000 | 0.100 | 124 | 10.1 | $7 \times 10^3$ | 9.1 |
| 51* | 90.900 | 0.100 | 5.000 | 2.000 | 2.000 | 128 | 10.3 | $8 \times 10^3$ | 8.5 |
| 52* | 89.900 | 0.100 | 5.000 | 2.000 | 3.000 | 192 | 9.1 | $5 \times 10^3$ | 9.0 |
| 53* | 92.899 | 0.100 | 7.000 | 0.001 | 0 | 40 | 4.0 | $6 \times 10^3$ | 6.2 |
| 54* | 92.898 | 0.100 | 7.000 | 0.001 | 0.001 | 58 | 4.5 | $6 \times 10^3$ | 6.0 |
| 55* | 92.799 | 0.100 | 7.000 | 0.001 | 0.100 | 62 | 4.6 | $6 \times 10^3$ | 5.8 |
| 56* | 90.899 | 0.100 | 7.000 | 0.001 | 2.000 | 69 | 6.2 | $7 \times 10^3$ | 5.8 |
| 57* | 89.899 | 0.100 | 7.000 | 0.001 | 3.000 | 99 | 4.9 | $5 \times 10^3$ | 7.1 |
| 58* | 91.900 | 0.100 | 7.000 | 1.000 | 0 | 49 | 4.4 | $6 \times 10^3$ | 10.2 |
| 59* | 91.899 | 0.100 | 7.000 | 1.000 | 0.001 | 74 | 4.9 | $6 \times 10^3$ | 10.0 |
| 60* | 91.800 | 0.100 | 7.000 | 1.000 | 0.100 | 80 | 5.5 | $6 \times 10^3$ | 9.9 |
| 61* | 89.900 | 0.100 | 7.000 | 1.000 | 2.000 | 91 | 6.8 | $6 \times 10^3$ | 9.8 |
| 62* | 88.900 | 0.100 | 7.000 | 1.000 | 3.000 | 122 | 5.3 | $5 \times 10^3$ | 9.9 |
| 63* | 95.800 | 0.100 | 1.000 | 3.000 | 0.100 | 197 | 6.5 | $4 \times 10^3$ | 20.5 |
| 64* | 92.900 | 0.100 | 1.000 | 3.000 | 3.000 | 227 | 6.3 | $4 \times 10^3$ | 18.4 |

*Comparison sample

As shown by Examples 1 to 5, $Nb_2O_5$ and $Ta_2O_5$ dissolve as solid solution into the crystal having $SrTiO_3$ as host material at the reduced firing and thereby to reduce specific resistance of the fired body by about 1.0 $\Omega$cm by atomic valency controlling, and therefore, by refiring in the air it shows varistor characteristics such that high resitance layers are formed at the grain boundaries of the fired bodies.

And, $Nb_2O_5$ is contained in $TiO_2$ in the material as inclusion, and is contained in 0.001–0.200 mol % in the raw material usually to be industrially refined. In case the $SrTiO_3$ is semiconductorized only with $Nb_2O_5$ the specific resistance becomes rather high, and the characteristic is unstable though it shows the varistor characteristics. But by addition of $Ta_2O_5$ to $Nb_2O_5$, the specific resistance can be lowered, and stable characteristics are obtainable. When the added amount of $Ta_2O_5$ is too much, dissolution as solid solution of other additives is hindered, and accordingly 0.001–5.000 mol % of it is appropriate.

By making segregation at granule boundaries by addition of $MnO_2$, the granule boundaries is changed to a high resistance value and the energy barrier of the granule boundaries. Therefore, by the addition of $MnO_2$, the non-linearity exponent $\alpha$ becomes large and at the same time the varistor voltage becomes high.

Besides, by the addition of $MnO_2$ the high resistance region of the granule boundaries expands, and accordingly this means that thickness of the insulation layer increases, and thereby the dielectric constant decreases.

Since $MnO_2$ takes plural valency, there is a possibility of producing hopping conduction between different Mn valency. Therefore, when the amount of addition of $MnO_2$ increases the tan δ becomes large, to induce a cause of deterioration of the characteristic. Accordingly, as the amount of addition of $MnO_2$, 0.001–2.000 mol % is appropriate. When La, Cu, Y, Mo, Pb and W are added, for the amount of $MnO_2$, a range of 0.001 to 0.01 mole % is desirable for Na an amount of 0.001 to 0.02 mol % is desirable.

When at least one element selected from the group consisting of Ga, Pt, Tl, Si, Ti, Li, La, Cu, Y, Cs, Au, Mo, S, Be, Al, Na, K, Ca, Cd, In, Ba, Pb, Eu, Gd, Tb, Tm, Lu, Th, Ir, Os, Hf, Ru, Mg, Zr, Sn, Sb and W is added at the same time, it is possible to increase the dielectric constant and decrease the tan δ, without changing the non-linearity exponent α increased by $MnO_2$, to greatly improve the characteristic, but the dielectric constant becomes small when the amount of addition becomes much; and accordingly 0.001–2.000 mol % is appropriate.

Though in the examples, only the cases where Ga, Pt, Tl, Si, Ti, Li, La, Cu, Y, Cs, Au, Mo, S, Be, Al, Na, K, Ca, Cd, In, Ba, Pb, Eu, Gd, Tb, Tm, Lu, Th, Ir, Os, Hf, Ru, Mg, Zr, Sn, Sb and W are added each as simple substance, it is confirmed that even when plural kinds of elements are added within the determined amount at the same time, the same effect is obtainable.

Figure 4:
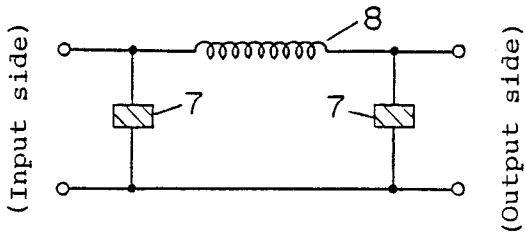
FIG. 4 is a circuit diagram of a noise filter using the voltage dependent non-linear resistance ceramic composition in accordance with the present invention.
Figure 5:
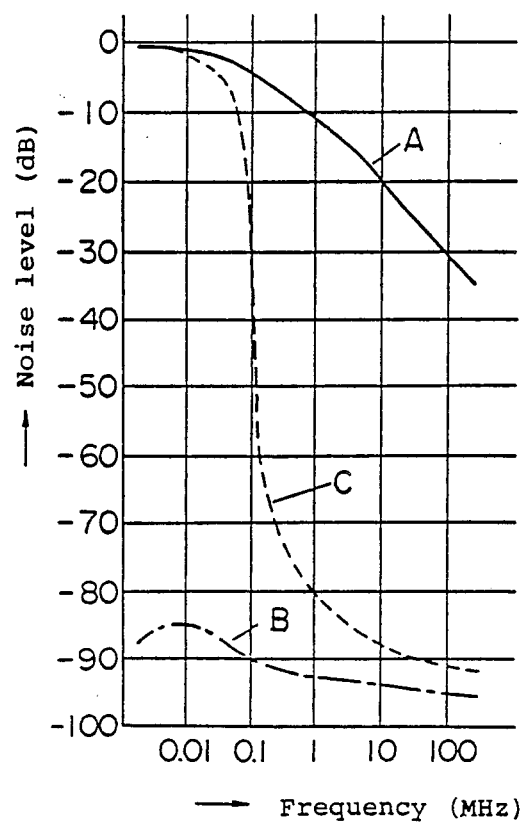
FIG. 5 is a characteristic chart showing situation of input noise and output in accordance with circuit of noise filters of the present invention and the prior art.

A noise filter as shown in FIG. 4 is constituted by using the elements 7 on which electrodes are provided by conductive material such as Ag and a coil 8, and noise input A shown in FIG. 5 is impressed, and thereby noise output B is obtained.

As is obvious from this, noise is sufficiently removed, and that number of components is decreased by combining the simple body element and a coil, and a miniaturization becomes possible.

POSSIBLE UTILIZATION IN INDUSTRY

As has been elucidated, according to the voltage-dependent non-linear resistance ceramic composition, absorption of surge impressed on the electric and electronic apparatuses and elimination of noise can be done by a single element, and it has many functions and can be miniaturized and is indispensable for protection of semiconductor product of the electric and electronic apparatuses, and practical utility thereof is extremely great.

We claim:
1. A voltage-dependent non-linear resistance ceramic composition consisting essentially of:
90.800–99.996 mol % of $SrTiO_3$,
0.001–0.200 mol % of $Nb_2O_5$,
0.001–5.000 mol % of $Ta_2O_5$,
0.001–2.000 mol % of $MnO_2$, and
0.001–2.000 mol % of an oxide of at least one of element selected from the group consisting of Ga, Pt, Tl, Si, Ti, Cs, Au, S, Be, Al, Ca, Cd, In, Ba, Eu, Gd, Tb, Tm, Lu, Th, Ir, Os, Hf, Ru, Mg, Zr, Sn and Sb.

* * * * *